United States Patent [19]
Otsuka et al.

[11] 3,806,714
[45] Apr. 23, 1974

[54] SEQUENCE CONTROLLER

[75] Inventors: Kenichi Otsuka; Teroo Nakagawa; Yoshiyuki Shimokawa, all of Tokyo, Japan

[73] Assignee: Tokyo Shibaura Electric Co., Ltd., Kawasaki-shi, Japan

[22] Filed: July 19, 1972

[21] Appl. No.: 273,111

[30] Foreign Application Priority Data
July 22, 1971 Japan.............................. 46-54159

[52] U.S. Cl.................. 235/152, 235/197, 307/207,
[51] Int. Cl......................................... G06f/1/02
[58] Field of Search.................... 235/152, 156, 197; 307/207

[56] References Cited
UNITED STATES PATENTS

| | | | |
|---|---|---|---|
| 3,576,984 | 5/1971 | Gregg | 307/207 X |
| 3,584,205 | 6/1971 | Malaby et al. | 235/152 |
| 3,700,868 | 10/1972 | Silvertson | 235/152 |
| 3,579,119 | 5/1971 | Yau et al. | 307/207 X |
| 3,454,310 | 7/1969 | Wilhelm | 307/207 X |
| 3,596,075 | 7/1971 | Van Weelden | 307/207 X |

*Primary Examiner*—Malcolm A. Morrison
*Assistant Examiner*—James F. Gottman
*Attorney, Agent, or Firm*—Flynn & Frishauf

[57] ABSTRACT

A sequence controller in which a sequence input device receives varied sequence input information representing various operating sequences without specially programming it, the sequences being expressed by contactless symbol system notation. A memory device stores the sequence information fed to the sequence input device, an input unit converts the states of external equipments into logical values, an output unit holds various output signals representing the desired states of controlled output devices and provides control outputs, and an arithmetic control circuit selects and arithmetically operates on the output signals of the input unit and the output signals of the output unit in accordance with a program stored in the memory device. The arithmetic control circuit also transmits the result of the arithmetic operation to the output unit, to thereby execute the sequence represented by the contactless symbol system.

6 Claims, 13 Drawing Figures

FIG. 1A

FIG. 1B $$\left[\left(\left((13 \cdot \overline{315} \cdot 9) + \overline{8}\right) \cdot 101\right) + (105 \cdot \overline{83})\right] \cdot 310 = 250$$

SEQUENCE CONTROLLER

The present invention relates to a sequence controller for controlling sequences, and more particularly to a novel sequence controller which facilitates setting and recomposition of sequences.

Sequence controllers have heretofore been constituted by relays or contactless relays. For this reason, the wiring of such devices has been complicated. It has been accordingly impossible to mass-produce the sequence controllers. Moreover, the prior-art devices have been extremely troublesome in that, in a case where a sequence once set is to be modified, the wiring must be changed, thereby rendering it difficult to modify the sequence.

Nowadays, as the electronics art advances, there is suggested a method in which a sequence is controlled by storing same in memories such as magnetic cores.

An object of the present invention is to provide a sequence controller which is easily varied and which can easily carry out a sequence expressed by the contactless diagram symbol system.

SUMMARY OF THE INVENTION

In order to accomplish the above-mentioned object, the present invention comprises a sequence input device which receives sequence information for varied sequences without specially programming it, the sequence to be carried out being expressed by contactless diagram symbols, a memory device which stores sequences fed thereto by said sequence input device, an input unit which converts states of external equipments into signals representing logical values, an output unit which holds output states and which provides control outputs, and an arithmetic control circuit with which, in accordance with the sequence stored in the memory device, performs arithmetic operations on the outputs from the input unit and/or the output unit, the result of the arithmetic operations being transmitted to the output unit.

With the above construction, it becomes possible, when the sequence is expressed by the contactless diagram symbols, to simply and clearly set, modify and check the sequence. It is not necessary to make any special program to feed in sequences to be carried out. A sequence can accordingly be attained by mere manipulation of push buttons without any particular knowledge of programming.

The present invention can be more fully understood from the following detailed description when taken in connection with the accompanying drawings, in which.

Figure 1A:
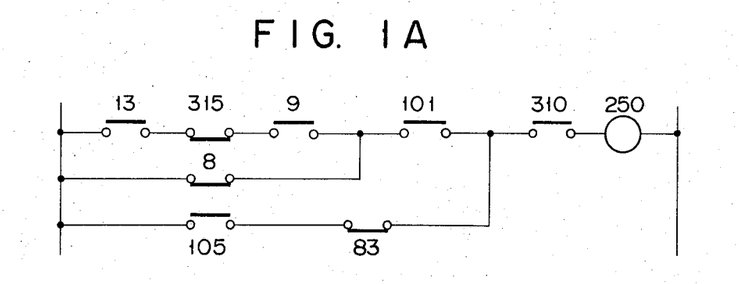
FIG. 1A is a diagram showing a sequence by the contact diagram symbol system.
Figure 1B:
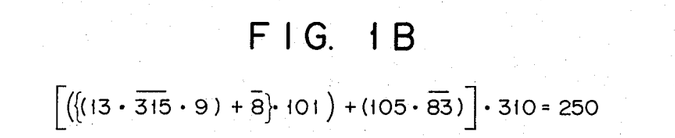
FIG. 1B is a diagram showing the sequence represented by Boolean algebra.
Figure 1C:
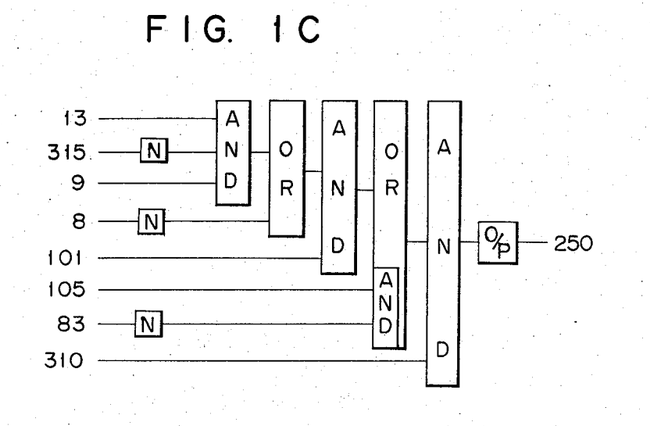
FIG. 1C is a diagram showing the sequence by the contactless diagram symbol system.

In a rough classification, there have hitherto been three methods for indicating a sequence. A sequence in FIG. 1A is indicated by the contact diagram symbol system. In FIG. 1A, reference numerals 13, 9, 101, 310 and 105 designate normally-open contacts, numerals 315, 83 and 8 normally-closed contacts, and numeral 250 a relay coil. The same sequence is represented in FIG. 1B by means of Boolean algebra, while it is represented in FIG. 1C by the contactless diagram symbol system. In FIG. 1C, AND signifies a logical product circuit, OR a logical sum circuit, and N a negative circuit. In addition to the systems of FIGS. 1A, 1B and 1C, there are systems which indicate sequences by program languages of computers. When the various indicating systems are compared, the contactless diagram symbol system is believed to be the most suitable taking into consideration the facts that (1) the sequence can be easily set without knowledge of the computer, (2) when looked at, the sequence can be easily understood and checked, and (3) the contact diagram symbol system is presently being more and more discarded in favor of the contactless diagram symbol system.

Figure 2:
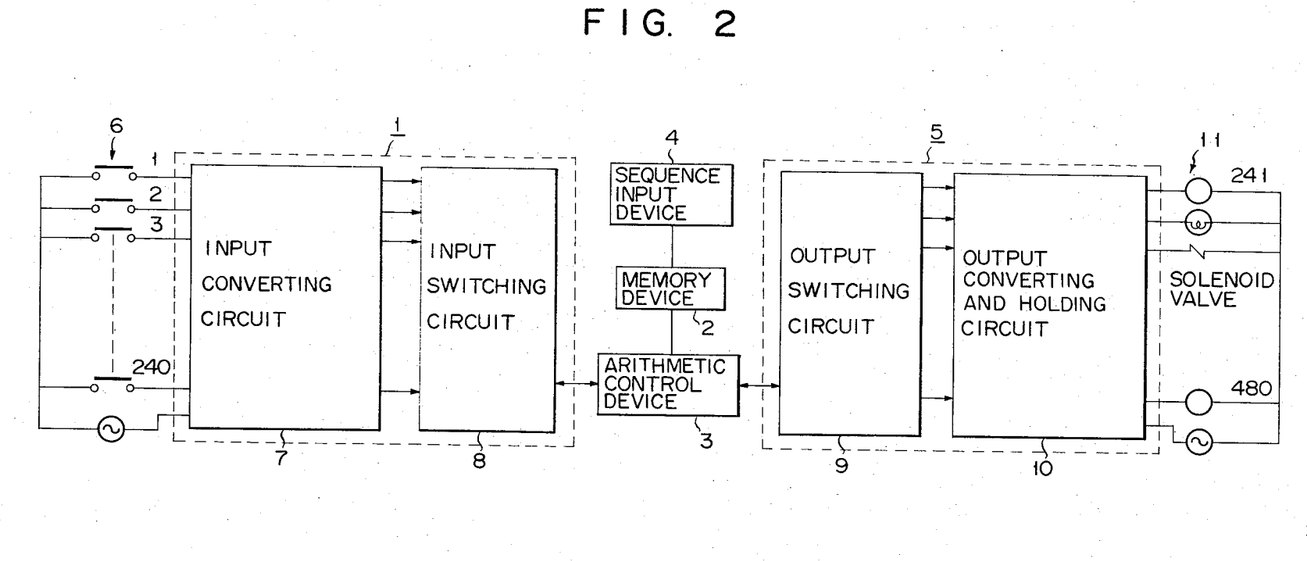
FIG. 2 is a block diagram showing the whole of an embodiment of the sequence controller according to the present invention.

FIG. 2 is a block diagram showing the whole of an embodiment of the sequence controller according to the present invention. The sequence controller of the present invention comprises an input unit 1, a memory device 2, an arithmetic control device 3, a sequence input device 4 and an output unit 5. Connected to the input unit 1 are input contacts 6 which apply inputs set by, for example, control switches or limit switches being provided exterior to the sequence controller. The states of the input contacts 6 are supplied to the input unit 1 in the form of logical states (i.e., logical signals ON, OFF). The sequence is controlled by changes in the conditions of the input contacts 6. The input unit 1 comprises an input converting circuit 7 and an input switching circuit 8. Although not shown in detail, the input converter 7 subjects the states of the input contacts 6 to the wave-form shaping, and converts them into the states of 1 and 0 which are logical signal values. Herein, the states of the input contacts 6 are converted so as to be employable as input signals. In this case, the number of connectible input contacts 6 can be arbitrarily selected in proportion to the size of the equipment. It is assumed in the embodiment that 240 inputs can be connected, which are assigned with the numbers from No. 1 to No. 240.

The input switching circuit 8 is a circuit arrangement which serves to select the input contact 6 appointed by the arithmetic control device 3, and to feed the state of the selected input contact 6 (namely, the state 1 or 0) to the arithmetic control device 3.

The sequence input device 4 is an input unit for inputting or feeding in a sequence which is expressed by contactless symbols as described previously. The fed-in sequence is stored in the memory device 2. The memory device 2 is a memory device which is capable of reading and writing information, such as conventional magnetic cores, magnetic drum and magnetic disc.

The arithmetic control device 3 effects such control of conducting operations in accordance with the sequence fed in to the memory device 2 by the sequence input device 4, and feeding out the output to the output unit 5.

The output unit 5 comprises an output switching circuit 9 and an output converting and holding circuit 10. The output switching circuit 9 selects the corresponding one of the output devices or appliances 11 in response to the output information from the arithmetic control device 3, for example, information commanding turn on a certain lamp or start a certain motor. The output switching circuit 9 simultaneously effects the function of informing the arithmetic control device 3 of the state of the output appliance 11. The output converting and holding circuit 10 is actuated by the output information from the arithmetic control device 3, to store and hold the information and to drive the selected output appliance 11. The output appliances or means 11 are respectively connected to the output converting and holding circuit 10. In the illustrated embodiment 240 output devices 11 can be connected, which are assigned with Nos. 241 to 480.

The details and operations of the various devices of the sequence controller will now be explained. Prior to the explanation, description will be made of the form with which the sequence shown in FIG. 1C is stored in the memory device 2. In the embodiment, each address of the memory device 2 is made up of 10 bits. The number of 0 to 1023 can accordingly be expressed in decimalism. Among the 10 bits, the first bit at the lowest order to the ninth bit represent the respective input contacts 6 and output appliances 11, and Nos. 1 to 480 are used. The tenth bit represents logical negation. That is, the negation of input contacts 6 No. 1 is 513 when it is expressed by 10 bits. Logical negation means the closed state if the contact is open and the open state if the contact is closed. 500 to 507 represent instructions, respectively. The significance of the various instructions are listed in Table 1 below.

TABLE 1

| Stored Contents | Instructions |
|---|---|
| 500 | AND |
| 501 | OR |
| 502 | AND/OR |
| 503 | OR/AND |
| 504 | Flip-Flop (set) |
| 505 | Flip-Flop (reset) |
| 506 | OUTPUT |
| 507 | SS |

In Table 1, AND means the logical produce between a result calculated up to the preceding stage and at least one given input, OR means the logical sum, AND/OR means the logical product of given inputs and then the logical sum between the result thereof and a result calculated up to the preceding stage, and OR/AND means the logical sum of given inputs and then the logical product between the result thereof and a result calculated up to the preceding stage. Flip-Flop energizes an output when a set input is supplied, while it de-energizes an output when a reset input is supplied. Since flip-flop takes two states and two states must be memorized, it consists of two instructions. OUTPUT denotes an instruction which drives the output appliance 11 by an operated result.

TABLE 2

| Address of memory device | Contents of memory device | Meaning |
|---|---|---|
| 000 | 500 | AND |
| 001 | 013 | 13 |
| 002 | 827 | NOT 315 |
| 003 | 009 | 9 |
| 004 | 501 | OR |
| 005 | 520 | NOT 8 |
| 006 | 500 | AND |
| 007 | 101 | 101 |
| 008 | 502 | AND/OR |
| 009 | 105 | 105 |
| 010 | 595 | NOT 83 |
| 011 | 500 | AND |
| 012 | 310 | 310 |
| 013 | 506 | O/P |
| 014 | 250 | 250 |

Table 2 lists states when the sequence shown in FIG. 1C is stored in the memory device 2. At the memory device 2, the sequence is successively stored from address 000. 500 is stored at address 000, and the instruction of operating the logical product of contents stored at the subsequent addresses is thus stored thereat. As a consequence, the logical product of the contents up to the next operating instruction, namely, up to an OR instruction shown at address 004 is operated. More specifically, the logical product is operated among the contents of input contact No. 13 as accommodated at address 001, contents accommodated at address 002 and negating output appliance No. 315, and the contents of input contact No. 9 as accommodated at address No. 3. Then, the logical sum is taken between the operated result and the states of the contacts as shown up to the next operating instruction after address 004. Such operations are conducted up to an outputting instruction, i.e., up to address 013 in Table 2. The operated result is fed out to output appliance No. 250 shown at the next address to the outputting instruction, that is, address 014. Thereafter, transfer is made to the operation of the next sequence. Such sequences are stored in the memory device 2 in the order of their addresses, and they are executed in succession.

In the above, the form of the contents stored in the memory device 2 has been described. Subsequently, description will be made of how the operations are carried out. Thereafter, there will be described the sequence input device 4 which can supply input sequences to the memory device 2 as illustrated in Table 2 without substituting into any special language the sequence expressed the contactless diagram symbols as shown in FIG. 1C.

Figure 3:
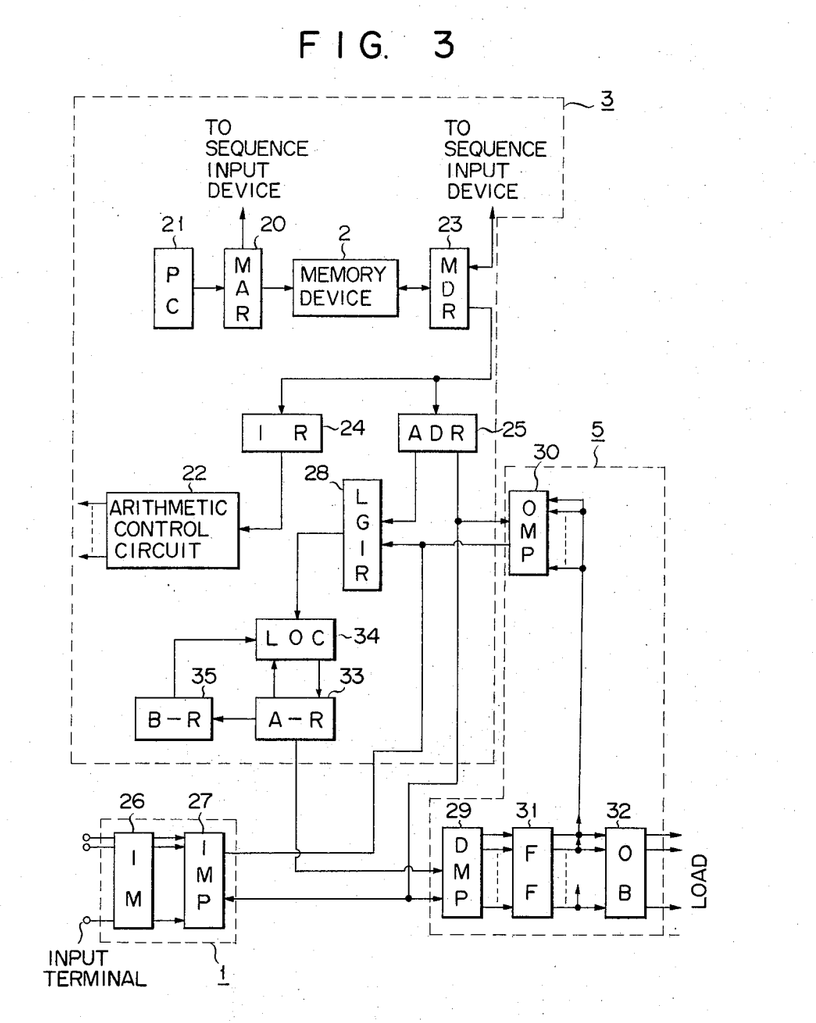
FIG. 3 is a detailed block diagram of the essential portions of an embodiment of the sequence controller according to the present invention.

FIG. 3 is a block diagram which shows the principal devices of the sequence controller according to the present invention in detail. The sequences programmed as previously stated are stored in the memory device 2. The address of the memory device 2 is appointed by a memory address register (hereinafter referred to as MAR) 20, and is driven. In the illustrated embodiment, the memory device 2 employs core memories to conduct destructive reading. The MAR 20 has the address appointed by a program counter (hereinbelow referred to as PC) 21. The PC 21 usually counts up every 1 by an instruction from an arithmetic control circuit 22 as will be discussed below. The PC 21 counts up to the maximum address of the memory device 2 (in some cases, however, interruption is carried out), and sequentially supplies the counted values to the MAR 20. When it counts up to the maximum address of the memory device 2, it becomes zero again. Accordingly, the contents of the memory device 2 are cyclically read out from address 000 in succession. The contents thus read out are fed to a memory data register (hereunder represented by MDR) 23. In dependence on whether the read contents are an operating instruction or the appointment of the input or output contact, the former is fed to an instruction register (hereinafter expressed by IR) 24, and the latter to an address register (hereinbelow expressed as ADR) 25. The instruction fed to the IR 24 is supplied to the arithmetic control circuit 22, and conducts the control of an operation herein.

The term arithmetic control is used to designate the opening of respective gates to shift data from a register to another register or the performing of a logical operation. Although it is complicated to explain the operation in succession, the foregoing reading operation, for example, is as below. At the first step, a gate not shown and between the PC 21 and the MAR 20 is opened, and the contents of the PC 21 are shifted to the MAR 20. At the next step, a gate not shown and between the MAR 20 and the memory device 2 is opened to read out the contents of an appointed address, and a gate also not shown and between the memory device 2 and the MDR 23 is opened to shift the read contents to the MDR 23. At the subsequent step, the contents set in the MDR 23 are shifted to the IR 24 or ADR 25. In this way, each instruction is decomposed to the respective steps, and the operating instruction is executed.

The input or output contact number set in the ADR 25 is fed to the input unit 1 or the output unit 5. The input converting circuit 7 and the input switching circuit 8 illustrated in FIG. 2 correspond to an input buffer (IB hereunder) 26 and an input mulitplexer (IMP hereunder) 27, respectively. The input contact number appointed by the ADR 25 is selected by the IMP 27, and its logical state is fed from the IB 26 to an LG1R (logic 1 register) 28. The LG1R 28 is a register of 1 bit. On the other hand, the output switching circuit 9 shown in FIG. 2 consists, in FIG. 3, of a demultiplexer (DMP hereinafter) 29 and an output multiplexer (OMP hereinbelow) 30. In the present invention, the DMP 29 is a unit which, when the given instruction is an outputting instruction, selects the output number specified in the ADR 25 and transmits the operated result from an A-R (A-register) 33 to the output converting and holding circuit 10 shown in FIG. 2 as will be hereinafter stated. The output converting and holding circuit 10 consists of a group of flip-flop circuits (FF hereunder) 31 and an output buffer (OB hereunder) 32. The FF 31 holds an output state, and with the output, the output appliance or equipment is driven by the OB 32. On the other hand, the OMP 30 transmits to the LG1R 28 the state of the output appliance specified by the ADR 25, and effects quite the same function as that of the IMP 27.

In this way, the state of the input contact or output appliance specified by the ADR 25 is set in the LG1R 28. As has been previously stated, each number is represented by 10 bits, and the bit at the highest order expresses logical negation. Therefore, the highest-order bit of the ADR 25 is also fed to the LG1R 28. If the bit is 1, the content of the LG1R 28 is negated. Since the LG1R 28 is a register of 1 bit and the register is usually formed of flip-flops, such negation is easily enabled.

On the other hand, a logic operation circuit (LOC hereunder) 34 is a device in which an operation is conducted in conformity with the foregoing operational instruction. Basically, the operation is reduced to take the logical sum and the logical product. Consequently, the LOC 34 consists basically of AND circuits and OR circuits. The operation is carried out in such way that, in accordance with the operational instruction, signals of the LG1R 28, A-R 33 and B-R (B-register) 35 are selected to be supplied to the circuit arrangement.

The result of the operation is accommodated in the A-R 33. The contents of the A-R 33 and of the LG1R 28 are operated on in the LOC 34 in accordance with the operating instruction indicated in the IR 24, and the result is filed in the A-R 33 again. At the beginning of each sequence, however, no information is contained in the A-R 33, and the operation is impossible to be carried out. At such time, when the first instruction of the sequence is given, 1 is set in the A-R 33 if it is an AND instruction, whereas 0 is set in the A-R 33 if it is an OR instruction. The controls are performed by the arithmetic control circuit 22.

The B-R 35 is a register for temporarily storing a result in the course of carrying out an operation, and its function will be discussed hereinafter.

Since the outline of the functions of the various devices has been explained, description will now be made of how the program shown in Table 2 is executed. Thereafter, description will be made of how operational instructions not shown in Table 2 are executed.

When the PC 21 specified address 000, its contents 500 are read out, and are set in the MDR 23. The contents are the AND instructions as previously stated, and are fed to the IR 24 to thereafter conduct the operation of the logical product. The contents are simultaneously the first instruction of the sequence, so that they set 1 in the A-R 33. When, subsequently, the PC 21 is counted up by one to specify address 001, the contents 13 are read out into the MDR 23. Since the contents are an input number, they are set in the ADR 25. The IMP 27 is thereby driven to feed the state of contact No. 13 to the LG1R 28. The content of the LG1R 28 and that of the A-R 33 are fed to the LOC 34 to take the logical product, and the result is set in the A-R 33. Next, address 002 is specified by the PC 21, its contents 827 are read out, and they are set in the ADR 25. As in the foregoing, the contents 827 represent the negation of 315. Accordingly, the state of appliance No. 315 is fed from the OMP 30 to the LG1R 28, and its negation is taken. Since, on the other hand, the AND instruction is still kept filed in the IR 24, the contents of the LG1R 28 and A-R 33 are transmitted to the LOC 34 to take the logical product therein. The result is accommodated in the A-R 33. Subsequently, address 003 is read out by the PC 21, the logical product between the state representation of contact No. 9 and that of the A–R 33 is taken, and the result is entered into the A–R 33. Subsequently, address 004 is read out, and the instruction set in the IR 24 changes to an OR instruction.

When the operations are thus conducted in succession and address 008 is read out, an AND/OR instruction is set in the IR 24. As stated above, the AND/OR instruction is an instruction which causes taking the logical sum between the result of the logical product of contents given thereafter and the content of the A–R 33. The operation is performed as described below. The content of the A–R 33 is shifted to the B–R 35. This time, the content of the A–R 33 is set at 1. Next, the content 105 of address 009 is read out, the logical product between it and the contents of the A–R 33 is taken, the logical sum between this result and the content of the B–R is taken, and the result is set in the A–R 33. (If there is a further input, the logical product between the input and the content of the A–R 33 is taken, the logical sum between this result and the content of the B–R 35 is taken, and the result is set in the A–R 33. The procedure is repeated. The content of the B–R 35 is invariable during the operations.) This is expressed by a logical equation as follows, letting $x$ be the operated result up to address 007:

$$(X + 105) \cdot \text{NOT } 82 + X = 105 \cdot \text{NOT } 83 + X \cdot \text{NOT } 83 + X \quad (1)$$

Herein, if $X$ is 1, the operated result becomes 1, so that the second term on the right side of Equation (1) is not related. If $X$ is 0, the second term on the right side of Equation 1 is not related similarly. Accordingly, $X + 105 \cdot \text{NOT } 83$ is performed, and the AND/OR instruction is executed. This is quite the same even when the number of inputs for the logical product operation is increased in the AND/OR instruction. All the operations are conducted by the arithmetic control circuit 22.

After the operations are thus executed, the output instruction is issued at address 013. The output equipment number is specified at address 014, the operated result filed in the A–R 33 is fed to the output unit 5, and the particular output equipment is driven.

In the sequence controller according to the present invention, the OR/AND instruction and the flip-flop instructions other than the above-mentioned instructions are present as listed in Table 1. There will be described hereunder how they are executed. Let it be supposed that the instruction at address 008 as shown in Table 2 is the OR/AND instruction. As in the foregoing, the operated result $X$ up to address 007 is filed in the A–R 33. The content of the A–R 33 is shifted to the B–R 35, and simultaneously, said content of the A–R 33 is made zero. Next, the content 105 at address 009 is read out, the logical product between it and the content of the B–R 35 is taken, the logical sum between this result and the content of the A–R 33 is taken, and the result is set in the A–R 33. Subsequently, the information NOT 83 at address 010 is read out, the logical product between it and the content of the B–R 35 is taken, the logical sum between this result and the content of the A–R 33 is taken, and the result is set in the A–R 33. This is expressed by a logical equation as follows:

$$X \cdot 105 + X \cdot \text{NOT } 83 = X(105 + \text{NOT } 83) \quad (2)$$

Thus, the OR/AND instruction is executed.

Description will now be made of the flip-flop instruction. It is herein assumed that the flip-flop instruction operates a reset preference flip-flop. Although, in addition, there are a set preference flip-flop, the usual R–S flip-flop etc., the intrinsic natures are the same. It is now supposed that the contents of address 011 in Table 2 are the flip-flop instruction. As is well known, the flip-flop has the set state and the reset state. If the present state of the flip-flop is the set state, it is represented by 504, and if the reset state, it is represented by 505. The result operated up to address 010 is made a set input of the flip-flop instruction, while a reset input is assigned at address 012. Of course, which is made the set input (or reset input) is determined by the design of the particular system. On the other hand, if the present state of the flip-flop is the set state at the flip-flop given at address 011, the B–R 35 is set, and if it is the reset state, the B–R 35 is reset. In other words, the state of the flip-flop at that time is filed in the B–R 35. In the A–R 33, the operated result up to address 010 is filed. When the contents of address 012 are set in the LG1R 28, the following operation is conducted:

$$(A–R + B–R) \cdot \text{NOT } LGlR \rightarrow A–R \quad (3)$$

where an arrow means to file the result in A–R 33. The truth table at this time is shown in Table 3.

TABLE 3

Truth Table of Flip-Flop Instructions

| Before Operation: | | | | After Operation: | |
|---|---|---|---|---|---|
| Set Input (A–R) | Reset Input (LGIR) | Flip-Flop (B–R) | Instructions | Flip-Flop (A–R) | Instructions |
| 1 | 1 | 1 | 504 | 0 | 505 |
| 1 | 0 | 1 | 504 | 1 | 504 |
| 0 | 1 | 1 | 504 | 0 | 505 |
| 0 | 0 | 1 | 504 | 1 | 504 |
| 1 | 1 | 0 | 505 | 0 | 505 |
| 1 | 0 | 0 | 505 | 1 | 504 |
| 0 | 1 | 0 | 505 | 0 | 505 |
| 0 | 0 | 0 | 505 | 0 | 505 |

Although the explanation of the arithmetic control device 3 has thus far been completed, it is not restricted to the foregoing embodiment. For example, if, in a case where the first instruction of the sequence is given, it is the AND instruction, the above embodiment sets the A–R 33 at 1, and if it is the OR instruction, the same sets the A–R 33 at 0. However, this is not restrictive, but it may also be adopted to judge that the instruction is the first one of the sequence, and to directly shift the next issuing input or output number from the LGIR 28 to the A–R 33.

In the execution of the instruction AND/OR, it is also possible that, if the operational result up to the preceding stage is 1, performance of the operation of AND/OR is no longer necessary, and the operation is jumped to the next instruction, and that, if the operational result up to the preceding stage is 0, only the logical product is simply taken for inputs applied thereafter. In case of the OR/AND instruction, it is similarly possible that, if the operational result up to the preceding stage is 0, the operation is jumped to the next instruction, and that, if the operational result up to the preceding stage is 1, the logical sum is simply taken for the subsequent inputs. Herein, the jump instruction may, in actuality, continue to count up the PC 21 until the next operating instruction is read out and in such way that it closes any gate so as to prevent an operation from being conducted.

Further, a variety of modifications can be considered.

As described above, it is possible to operate the sequence by the arithmetic control circuit 3 in accordance with the program stored in the memory device 2, and to control the output equipment 11.

Figure 4:
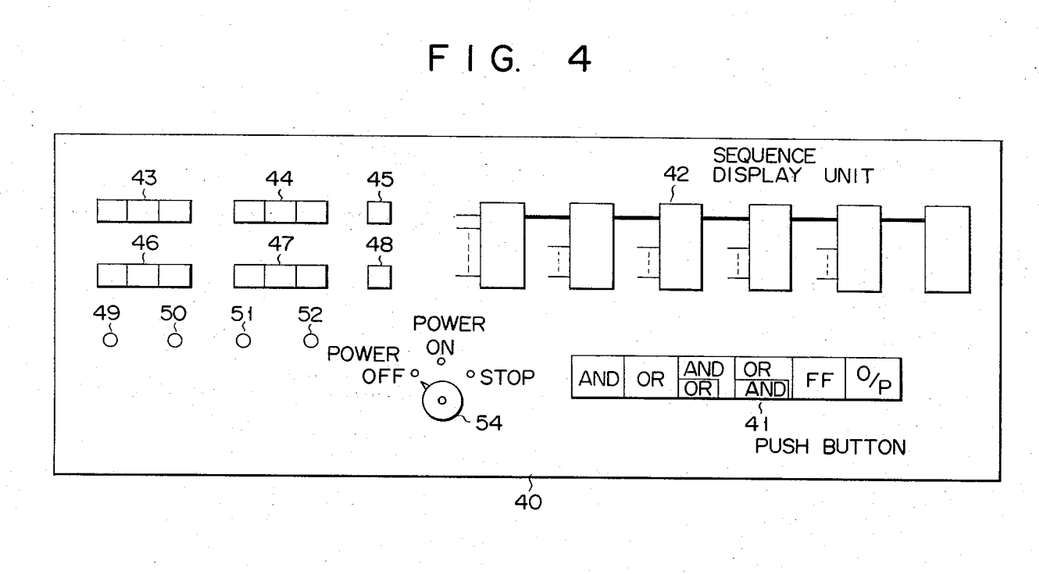
FIG. 4 is a plan view showing a console panel of a sequence input device of the sequence controller according to the present invention.

FIG. 4 shows a console panel 40 of the sequence input device 4. The various instructions listed in Table 1 are indicated in the form of operating instruction-specifying push buttons 41 on the console panel 40. When any one of the operating instruction-specifying push buttons 41 is depressed, contents indicated by it are fed to the memory device 2. This will be stated hereinbelow. Reference numeral 42 designates a sequence display unit, in which is displayed how each sequence is composed. In the illustrated embodiment, one sequence is constituted of by at most six operating instructions. Even a very large sequence can be expressed by six operating instructions, if modifications of the logical design are conducted. How many such sequences can be executed, depends on the capacity of the memory device 2. How the display is made on the sequence display unit 42, will be explained hereinafter. Besides disposed on the console panel 40 are a memory address display unit 43, an input and output display unit 44, a logical negation display unit 45, a sequence initiating address-specifying switch 46, an input and output number-specifying switch 47, a logical negation specifying button 48, an address incrementing button 49, an address decrementing button 50, a sequence initiating address-reading button 51, an input and output number-reading button 52, and a power switch 54. How they operate, will be explained simultaneously with an input device control circuit.

Figure 5:
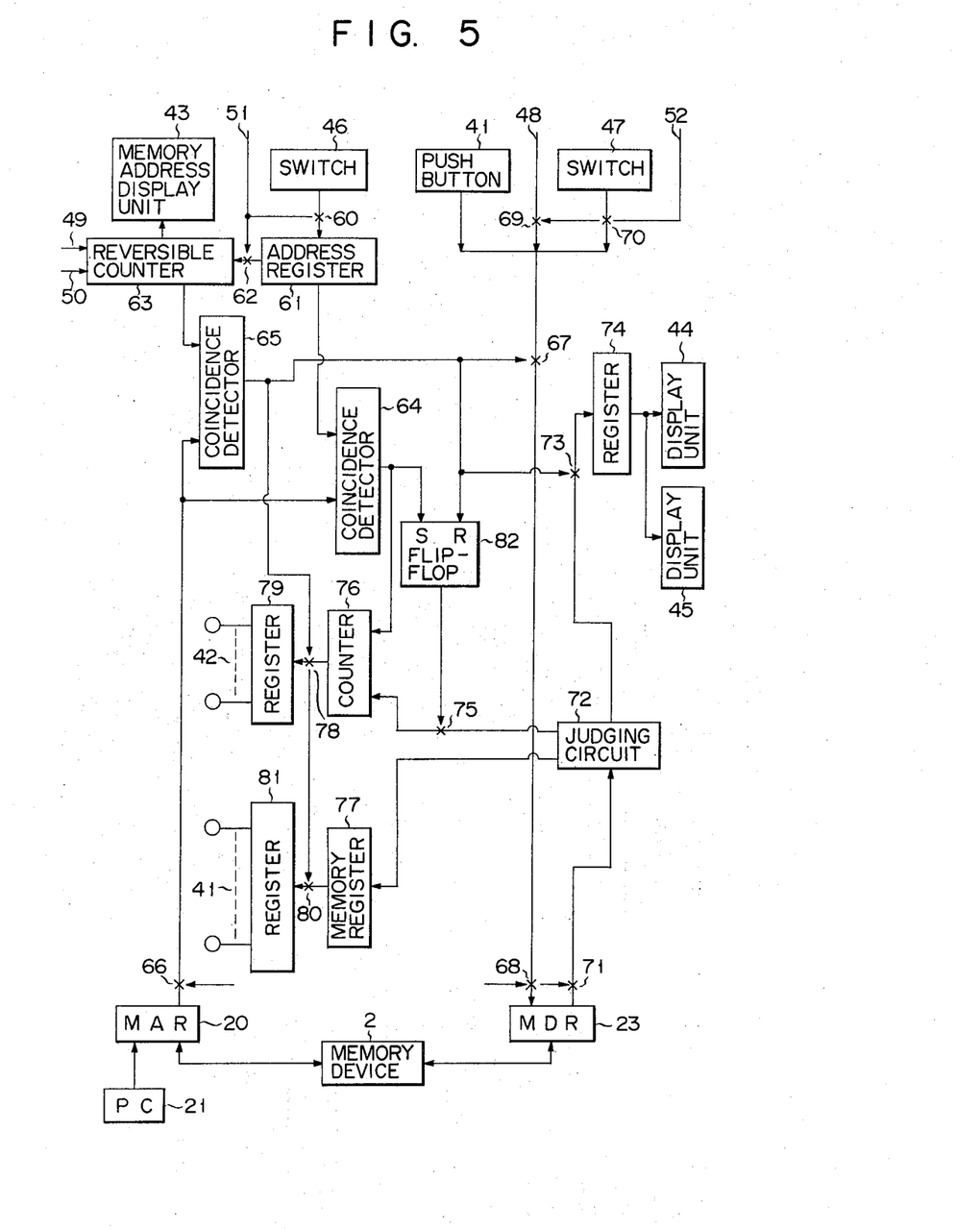
FIG. 5 is a block diagram showing an embodiment of a sequence input control device of the sequence controller according to the present invention.

FIG. 5 is a block diagram showing the sequence input control circuit of the sequence controller according to the present invention. In FIG. 5, all the marks X represent gates. When a sequence initiating address is specified by the sequence initiating address-specifying switch 46, its contents are set in an initiating address register 61 through a gate 60. The set contents are fed to a reversible counter 63 through a gate 62, and are simultaneously fed to a coincidence detector 64. The gates 60 and 62 are opened by depressing the sequence initiating address-reading button 51. Because no additional signal is supplied during setting of the sequence initiating address-specifying switch 46. The contents of the reversible counter 63 are displayed by the memory address display unit 43, and are simultaneously fed to a coincidence detector 65. The contents of the reversible counter 63 are increased by one by depressing the address incrementing push button 49, and are decreased by one by depressing the address decremnting push button 50. The contents of the MAR 20 are supplied as another input to the coincidence detectors 64 and 65 through a gate 66.

On the other hand, an operating instruction specified by the operating instruction-specifying push button 41 is coded, and is supplied to the MDR 23 through gates 67 and 68. A negation logic specified by the logical negation specifying button 48 is supplied to the MDR 23 through gates 69, 67 and 68. Contents specified by the input and output number-specifying switch 47 are supplied to the MDR 23 through gates 70, 67 and 68. The gates 69 and 70 are opened by the input and output number-reading button 52, while the gate 67 is opened by an output of the coincidence detector 65. On the other hand, the contents of the MDR 23 are fed to a judging circuit 72 through a gate 71, and are further supplied to an input and output number register 74 through a gate 73. The contents of the input and output number register 74 are fed to the input and output number display unit 44 and the negation display unit 45, and the respective contents fed to display unit 44 are displayed. The gate 73 is opened by the output of the coincidence detector 65.

The output of the judging circuit 72 is supplied to a counter 76 through a gate 75, and also to an instructing content memory register 77. The contents of the counter 76 are fed to a sequence display register 79 through a gate 78, and they are displayed in the sequence display unit 42. The counter 76 is reset by an output of the coincidence detector 64. The contents of the instructing content memory register 77 are supplied to a register 81 through a gate 80, and one of the operating instruction-specifying push buttons 41 is lit by the contents.

The output of the coincidence detector 64 becomes the set input of a flip-flop 82, while the output of the coincidence detector 65 becomes the reset input thereof. The flip-flop 82 is made a reset preference flip-flop so that it is reset when the set input and the reset input are simultaneously supplied. Only when set, the flip-flop 82 energizes its output to open the gate 75. Herein, the gates 66, 68 and 71 shall be normally open.

The function of such sequence input control device will now be explained.

First, the initiating address of the sequence is set by the sequence initiating address-specifying switch 46. When the initiating address-reading button 51 is depressed, the gates 60 and 62 are opened to set the sequence initiating address in the first-address register 61 and the reversible counter 63. The initiating address of the sequence is address 000 in the case of Table 2, and that of the next sequence is address 015. The contents of the reversible counter 63 are displayed in the memory address display unit 43, and indicate what address the input presently corresponds to. Thereafter, until the complete contents of the particular sequence are fed in, the contents of the reversible counter 63 are altered by the address incrementing button 49 and the address decrementing button 50, to rewrite the contents of the respective addresses. This is because, although the sequences are continuously written into the memory device 2, they have respective independent significances.

As described above, although the PC 21 is now driven in succession, no operation is performed since there are no contents of the memory device 2. When the contents of the MAR 20 appoint address 000, coincidence of the coincidence detector 65 is detected to energize the output thereof. The contents of the MAR 20 are sequentially changed, but the PC 21 is cyclically driven as stated previously. In consequence, in conformity with the time interval at which all the addresses of the memory device 2 are read out, the MAR 20 appoints the address 000 to energize the output of the coincidence detector 65. The same applies to the coincidence detector 64. The difference between the detectors 64 and 65 is that, in the case where on sequence is fed into the system, the contents of the sequence initiating address register 61 are not changed throughout the period during which the sequence is inputted i.e., from address 000 to address 014 in Table 2, whereas the contents of the reversible counter 63 are altered every time the respective contents of the sequence are read in.

The period of time of one cycle of the MAR 20 is at most approximately 20 milliseconds.

At address 000 in Table 2, the AND instruction is stored. An AND button among the operating instruction-specifying push buttons 41 is accordingly depressed. The instruction is fed to the MDR 23 in such way that, when the contents of the MAR 20 appoint address 000, the output of the coincidence detector 65 is energized to open the gate 67. In the embodiment, the memory device 2 employs core memories. As is well known, destructive reading is conducted in the core memories. For this reason, after the contents of an address appointed by the MAR 20 are read into the MDR 23, they are written again. The cycle time of the so-called rewriting is considerably longer than the cycle time of the arithmetic control circuit 22 for controlling each step. It is therefore possible to set new input information (the AND instruction in the above example) in the MDR 23 after the contents read into the MDR 23 are transmitted to the IR 24 or ADR 25 and before the rewriting is carried out. It is accordingly possible to rewrite the sequence even during execution of an operation, at the same time that such contents are written into the memory device 2.

Next, when the address incrementing push button 49 is depressed, the contents of the reversible counter are added by 1, to reach address 001. This is displayed in the memory address display unit 43, and the address for the subsequent input is indicated. In the case of Table 2, contact No. 13 is applied as a system input. Consequently, if, after setting the input and output number-specifying switch 47, the input and output number-reading button 52 is depressed to open the gate 70, coincidence of the coincidence detector 65 is provided when the MAR 20 is brought to 001. Then, the gate 67 is opened to feed the contents of the input and output number-specifying switch 47 to the MDR 23.

In the case of displaying a logical negation as at address 002 in Table 2, if the logical negation specifying switch 48 is kept depressed, the logical negation is specified simultaneously with the input or output number.

The contents of the MDR 23 are fed to the judging circuit 72. The judging circuit 72 judges whether the contents of the MDR 23 are an operating instruction or an input or output number. In case of the input or output number, when the coincidence output of the coincidence detector 65 is provided, the gate 73 is opened to feed said number to the input and output number register 74. The contents of the register 74 are displayed in the input and output number display unit 44 and logical negation display unit 45. In this way, in the input and output number display unit 44 and the logical negation display unit 45, the contents of the address being presently specified in the reversible counter 63 and displayed in the memory address display unit 43 are displayed if said contents indicate an input or output state.

In the case where the contents of the MDR 23 as judged by the judging circuit 72 denote an operating instruction, they are fed to the instructing content memory register 77. The contents of register 77 are shifted to the instruction register 81 in such way that, when the coincidence detection is performed by the coincidence detector 65, the gate 80 is opened. In conformity with the instructing contents, the corresponding instructing push button among the operating instruction-specifying push buttons 41 is lit. Thus, while addresses 000 to 003 listed in Table 2, for example, are inputted, the AND instruction specified at address 000 is held in the instructing content memory register 77. The AND instruction is therefore displayed in the operating instruction-specifying push button 41 throughout. When address 004 is reached, the OR instruction is displayed for the first time.

On the other hand, the flip-flop 82 is so arranged as to be set by the rise of the output of the coincidence detector 64, and to be reset by the fall of the output of the coincidence detector 65 (this may be accomplished by, for example, differentiating the output of the coincidence circuit 64 and differentiating the negation of the output of the coincidence circuit 65 and thus driving them with positive pulses, respectively). As a result, when the MAR 20 is cyclically specifying addresses, the output of the flip-flop 82 is energized to open the gate 75 from the sequence initiating address to an address presently intended to be inputted. Accordingly, if the contents of the MDR 23 are operating instructions, they are fed to the counter 76 by the judging circuit 72, and the number of the operating instructions is counted therein. Thus, if address 007 in Table 2 is now being inputted, there are three operating instructions till then, and the counter 76 is set at 3. Since, on the other hand, the gate 78 is opened by the output of the coincidence detector 65, it is known what operating instruction an address presently intended to be stored is contained in. This is displayed in the operating instruction display unit 42. The counter 76 is reset by the coincidence detector 64.

The gate 68 is adapted to be closed when the power switch 54 shown in FIG. 4 is brought to the position of STOP. They are used when the sequence writing at the sequence input device 4 is thereby stopped to conduct the sequence control (however, the contents of the sequence are displayed).

As described above, it is possible that the sequence displayed by means of the sequence input device 4 by the contactless diagram symbols as shown in FIG. 1C is stored in the memory device 2 in the form as shown in Table 2 and by procedures on the sequence input panel 40. While, as to the input device, description has been made in conformity with Table 2, it is unnecessary as apparent from the above explanation to specially code the sequence shown in FIG. 1C on a coding sheet. This is because it is only required to sequentially depress the push buttons. In a case where it is desired to check the sequence, the sequence initiating address is appointed, and the respective addresses are indicated by the address decrementing button or the address incrementing button. Then, the states of the memory device at that time are displayed on the panel. The check can therefore be easily performed.

In the foregoing explanation of the sequence input device the MAR 20 is always driven by the PC 21. When, however, the sequence is first or fed into the system, a construction is also possible in which the MAR 20 is sequentially driven by the reversible counter 63 so as to sequentially feed writing instructions to the memory device 2.

While, in the foregoing embodiment, the memory device 2 employs core memories, it may also be comprised of a magnetic drum, magnetic disc etc. as has been mentioned hereinabove. In the latter case, the writing operation and the reading operation are separate in contrast to the case of the use of core memories. With core memories, as stated previously, when it is desired to rewrite the contents of a sequence during operation of the sequence, an address for the rewriting is specified in the reversible counter 63, and an operating instruction or a contact number is specified. Then, when the MAR 20 specifies the particular address, the contents read out are read into the MDR 23, and are fed into the IR 24 or ADR 25. Thereafter, the contents of the MDR 23 are rewritten. In a case where such is conducted with the devices other than core memories, it is also possible that, when the particular address is appointed at the memory device 2, it is checked if a content rewriting instruction is issued. If the rewriting instruction is issued, the rewriting is performed, and simultaneously, the operation is conducted with the specified contents. Then, the procedure is advanced to the next address.

Further, the memory device 2 need not be such memories capable of rewriting, but it may be a ROM (read only memory). In such case, when an instruction, such as the flip-flop instruction, which should modify memory contents is executed, a memory capable of rewriting may be used for the particular devices.

When the sequence is inputted and it is no longer modified, the input device may be used in separate manner.

Figure 7:
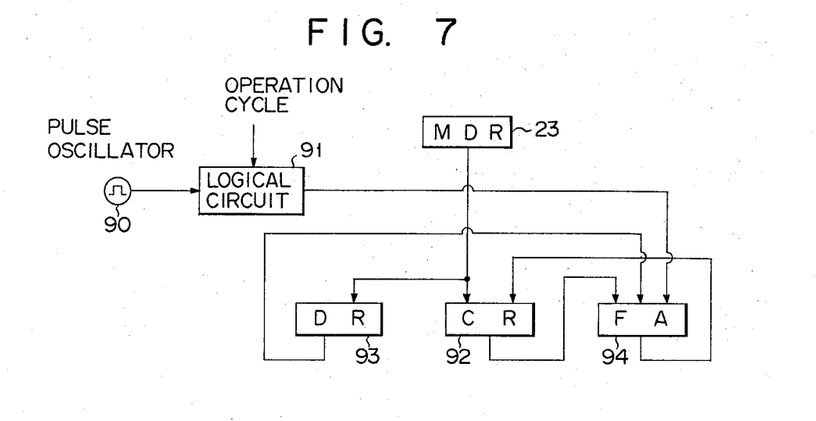
FIG. 7 is a block diagram showing a control circuit when as SS instruction is executed in the sequence controller according to the present invention.
Figure 8:
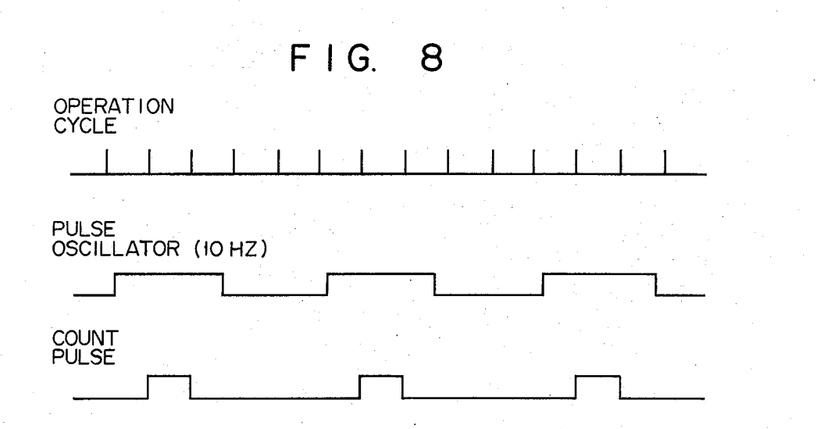
FIG. 8 is a time chart for explaining FIG. 7.

In the embodiment and in the drawing, the input contacts 6 are described and depicted as if they were constituted only of usual contacts. However, they may also be in the contactless form as composed of transistors, and may also be in the form of logic levels converted from analog inputs through an analog-to-digital converter. Moreover, with the sequence controller according to a present invention, the time-limit operation can also be executed. In this case, the control device 3 requires, in addition to the devices in FIG. 3 and as illustrated in FIG. 7, a pulse oscillator 90, a logical circuit 91 for count pulses, a C-register 92, a D-register 93, a full adder 94, and so forth. An instruction at this time is made to be an SS (single shot) instruction. At an address following the SS instruction, the period of time of SS is filed. The pulse width of the SS is assumed to be a fixed one of 2 seconds. The pulse oscillator is assumed to generate pulses at 10 Hz. Accordingly, the SS pulse width of 2 seconds corresponds to 20 counts of the pulses at 10 Hz. Let it be supposed that, in the logical circuit 91 for count pulses and as shown in FIG. 8, when the output of the pulse oscillator 90 is 1, the count pulse is generated only once in synchronism with the operating cycle. After all, the count pulse is one which is at 10 Hz and whose interval of 1 corresponds to 1 operating cycle.

With reference to instructions listed in Table 4, the operation of the SS instruction will be explained.

TABLE 4

| Memory Address | Memory Contents | Meaning of Memory |
| --- | --- | --- |
| 000 | 500 | AND |
| 001 | 013 | 13 |
| 002 | 827 | N315 |
| 003 | 009 | 9 |
| 004 | 501 | OR |
| 005 | 520 | N8 |
| 006 | 500 | AND |
| 007 | 101 | 101 |
| 008 | 507 | SS |
| 009 | 000 | 0 |
| 010 | 506 | 0/P |
| 011 | 250 | 250 |

Since the progress of the sequence from address 000 to address 007 is the same as in the foregoing, the explanation thereof is omitted.

At address 008, it is read in that the instruction is the single shot. Further, the content of A-R is shifted to the B-R 35.

An address following the single shot instruction, namely, address 009 is one for counting time. The contents of address 009 are filed in the C-R 92. If the content of the B-R 35 is 1, the count pulse and the contents of the C-R 92 are added by the full adder (FA) 94. The result is filed in the c-R 92 again.

When, however, all the contents of C-R 92 are 1, that is, the C-R has the maximum number, the addition makes all the contents 0 if the state of the count pulse is 1. Then, a carry is provided from the full adder 94. All the contents of the C-R 92 are therefore made 1 in this case. If the content of the B-R 35 is 0, the contents of the C-R 92 are reset to render all 0. Next, the contents of the C-R 92 are stored at the memory device 2 through the MDR 23 irrespective of the content of the B-R 35. Further, the number twenty is subtracted from the contents of the C-R 92, to judge whether or not the period of time of 2 seconds has elapsed. The subtraction and judgment are conducted by means of the full adder 94 by the addition between the contents of the C-R 92 and the complement of 2 of 20. The presence of a carry means that the period of time of 2 seconds has elapsed. The negation of the carry and the content of the B-R 35 is subjected to the logical product, and the result is filed in the A-R 33. If the A-R is of 1, it is meant that the SS is 1. The SS instruction is thereby completed, and the procedure is skipped to address 010. The procedure is thereafter similar to that of the previous case, so that the explanation thereof is omitted. While, in the foregoing, the SS pulse width is assumed to be fixed one of at 2 seconds, it can also be made variable. In the latter case, the procedure may be conducted as below. Address 009 following the SS instruction of address 008 is made the pulse width-specifying address, at which the pulse width is specified. Addresses at and after 010 are made the same as addresses at and after 009 in the previous case. However, the D-R 93 becomes necessary in order to temporarily store the specified pulse width value.

As described above, in comparison with the prior art sequence controller assembled with relay circuits, the sequence controller according to the present invention can simply and clearly set, modify and check a sequence expressed by contactless diagram symbols (or their composite diagram symbols), and is made small in size. Furthermore, when such a desired, i.e., fed into the system, sequence is inputted, there is only required a manipulation of push buttons etc. without the necessity for making any special program. Any particular knowledge of the circuitry, etc., on the part of the operator is accordingly unnecessary.

Figure 6A:
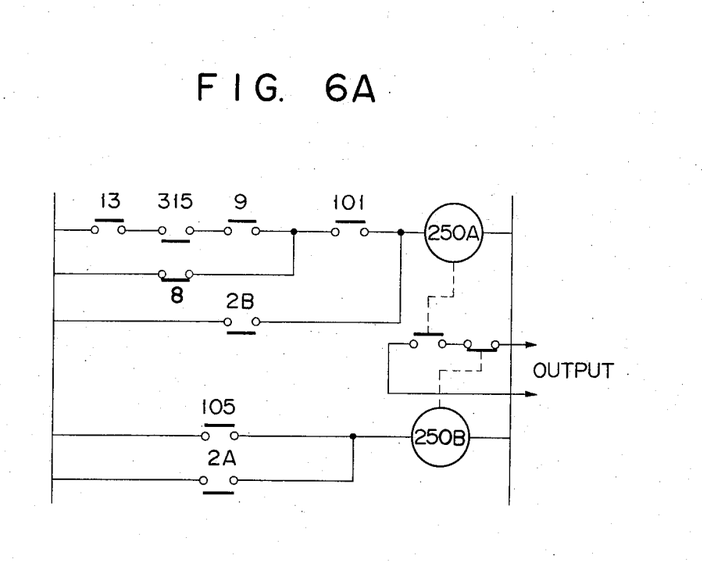
FIG. 6A is a diagram showing a flip-flop instruction by the contact diagram symbol system.
Figure 6B:
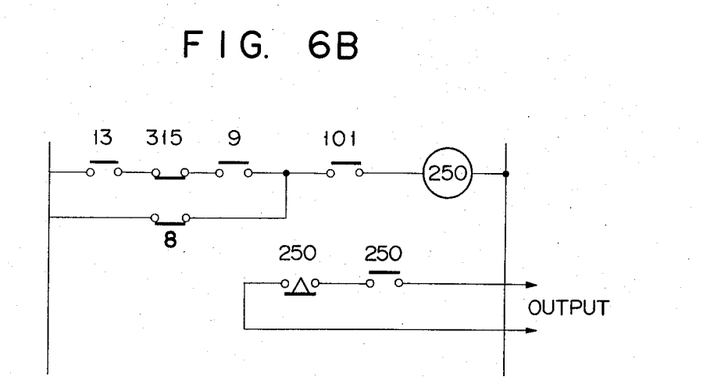
FIG. 6B is a diagram showing a single shot instruction by the contact diagram symbol system.
Figure 6C:
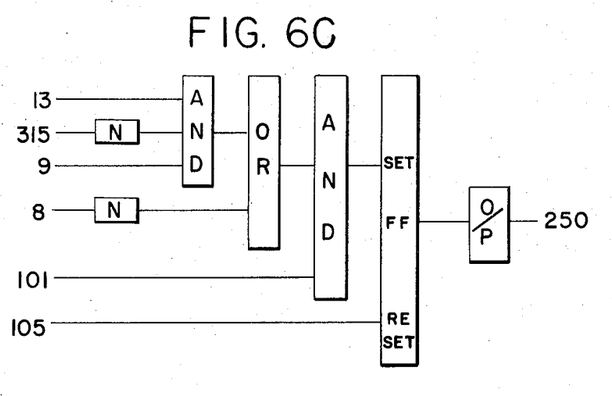
FIG. 6C is a diagram showing the flip-flop instruction by the contactless diagram symbol system instead of the contact diagram symbol system.
Figure 6D:
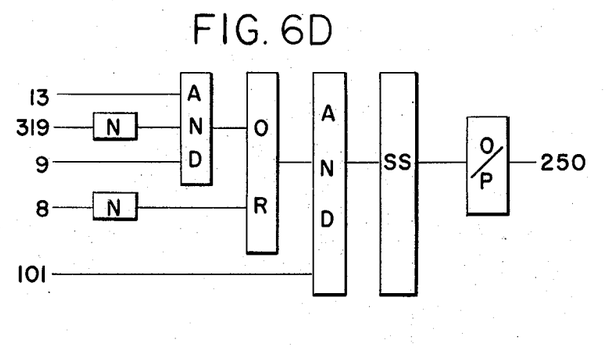
FIG. 6D is a diagram showing the single shot instruction by the contactless diagram system instead of the contact diagram symbol system.

Moreover, the sequence controller according to the present invention adopts the contactless diagram symbols in order to indicate the sequence. Therefore, composite functions such as an AND/OR instruction, OR/AND instruction and flip-flop instruction, and time-limit operations such as a single shot instruction can be simply expressed and easily executed. This is advantageous over the prior art in that, in the Boolean algebra representation, the time-limit operation cannot be expressed, while in the contact diagram symbol system, the flip-flop instruction and the single shot instruction cannot avoid becoming extremely complicated as respectively illustrated in FIGS. 6A and 6B. The sequence, however, is expressed by the contactless diagram symbol system as shown in FIGS. 6C and 6D which correspond respectively to FIG. 6A and FIG. 6B. The sequences illustrated in FIGS. 6C and 6D can easily be explained to, and be fully understood by, any operator even if he has no specific knowledge about computers, whereas the same sequences of FIGS. 6A and 6B are difficult to understand without specific technical knowledge.

What we claim is:

1. A sequence controller comprising:

a sequence input device which is responsive to contactless diagram symbol inputs representing a sequence without specially programming same, and for generating electrical signals which are a function of said sequence;

a memory device coupled to said sequence input device for storing the sequence information represented by said electrical signals which are generated by said sequence input device;

an input unit coupled to external input devices and which converts states of said external input devices into logical values;

an output unit coupled to output utilization devices and which holds signals representing output states supplied thereto and which provides control outputs; and an arithmetic control circuit coupled to said input and output units and to said memory device and responsive to said sequence information stored in said memory device, for performing arithmetic operations on signals representing the states of selected ones of the input devices and output utilization devices and for transmitting the result of said arithmetic operations to said output unit to control at least one output utilization device.

2. A sequence controller according to claim 1, wherein said contactless diagram symbol inputs are expressed by AND, OR, AND/OR, OR/AND, Flip-flop and SS symbolic inputs which are fed into said sequence input device as symbolic inputs.

3. A sequence controller according to claim 1, wherein said sequence input device comprises:

a sequence setting means for setting a sequence expressed by said contactless diagram symbol inputs;

circuit means for converting the sequence set into said setting means into said electrical signals and for shifting the said electrical signals to said memory device;

a display unit which displays the contents of said memory device in said contactless diagram symbols, and a checking circuit which checks said contents of said memory device and which provides outputs to said display unit.

4. A sequence controller according to claim 1, wherein said arithmetic control circuit comprises a 1-bit register which sets contents of said input and output units, an A-register which stores the result of an arithmetic operation, a B-register which temporarily holds the contents of said A-register, and a logic operation circuit responsive to the stored sequence information for selecting the contents of said 1-bit register, said A-register and said B-register and for performing arithmetic operations on the selected contents.

5. A sequence controller according to claim 1 wherein said sequence input device includes a keyboard means having a plurality of keys, each key representing a different contactless diagram symbol, said sequence being fed into said sequence input device by selective depression of said keys of said keyboard.

6. A sequence controller according to claim 3 wherein said setting means comprises a keyboard means having a plurality of keys, each key representing a different contactless diagram symbol, said sequence being fed into said sequence input device by selective depression of said keys of said keyboard.

* * * * *